United States Patent

[11] 3,543,779

[72] Inventors Herbert M. Eckerlin
Raleigh;
Morris V. Ward, Cary, North Carolina
[21] Appl. No. 645,761
[22] Filed June 13, 1967
[45] Patented Dec. 1, 1970
[73] Assignee Corning Glass Works
Corning, New York
a corporation of New York

[54] FLUIDIC AIR GAUGE SIGNAL AMPLIFICATION AND DISPLAY CIRCUIT
15 Claims, 4 Drawing Figs.
[52] U.S. Cl.................................................. 137/81.5;
235/201
[51] Int. Cl................................................. F15c 1/12
[50] Field of Search............................137/81.5; -
235/201(p.f., sens. gen.), 201(m.e.), 200(w.b., anal. gen.)

[56] References Cited
UNITED STATES PATENTS

| | | | |
|---|---|---|---|
| 3,467,122 | 9/1969 | Jones............................ | 137/81.5 |
| 3,232,095 | 2/1966 | Sumnoski et al.............. | 137/815X |
| 3,240,220 | 3/1966 | Jones............................ | 137/81.5 |
| 3,249,302 | 5/1966 | Bowles......................... | 137/81.5X |
| 3,253,605 | 5/1966 | Grubb.......................... | 137/81.5 |
| 3,277,914 | 10/1966 | Manion......................... | 137/81.5 |
| 3,285,264 | 11/1966 | Boothe......................... | 137/81.5 |
| 3,338,515 | 8/1967 | Dexter.......................... | 137/81.5X |
| 3,339,571 | 9/1967 | Hatch, Jr. .................... | 137/81.5 |
| 3,348,562 | 10/1967 | Ogren........................... | 137/81.5 |

*Primary Examiner*—Samuel Scott
*Attorneys*—Clarence R. Patty, Jr. and Walter S. Zebrowski ABSTRACT: A fluidic circuit for the amplification and display of a pneumatic signal from an air gauge.

Patented Dec. 1, 1970

3,543,779

INVENTORS.
HERBERT M. ECKERLIN
MORRIS V. WARD
BY Walter S. Zabrowski
ATTORNEY

3,543,779

FLUIDIC AIR GAUGE SIGNAL AMPLIFICATION AND DISPLAY CIRCUIT

BACKGROUND OF THE INVENTION

Air gauges, which comprise a nozzle through which air or other gas is discharged against some member or body for the purpose of determining the distance from said member, the thickness of said member, or the movement of said member, have heretofore been employed in connection with pressure sensing and display equipment which required high signal pressures. The displacement of the member or the distance from the gauge to the member is determined by the pressure variations upstream of the air gauge nozzle, that is the nozzle back pressure. The closer the air gauge is to the member, the higher the upstream or back pressure and conversely the greater the distance between the gauge and the member, the lower the upstream or back pressure, within the operating range of the device.

To achieve higher system sensitivity, it has in the past been necessary to increase the pressure level at which the air gauge operates and in turn the supply pressure. As is well known in the art, the linear range of such a system or apparatus has generally been low and is inversely proportional to the sensitivity of the apparatus. That is, to obtain a high sensitivity it has been necessary to have a short linear range while a long linear range could be realized only by sacrificing sensitivity. By linear range, as used herein, is meant that range of displacements of the nozzle from the member against which the stream is directed that is linear with changes in back pressure. This linear range is relatively limited since at low or high displacements, the displacement-back pressure variation relationship is not linear.

SUMMARY OF THE INVENTION

The objects of the present invention are to provide a fluidic air gauge signal amplification and display circuit which overcomes the heretofore noted disadvantages and which eliminates the need for a high signal pressure level of operation for the air gauge, increases system sensitivity without increasing supply pressure, and improves the linear range of the system.

Broadly, according to the present invention the control nozzle means of a first fluid amplifier stage is connected upstream to an air gauge with the outlet means thereof connected to the control nozzle means of a second fluid amplifier stage, the opposing control nozzle means of the first stage and of the second stage when the second stage comprises more than one fluid amplifier being connected to a suitable source of biasing fluid. The outlet means of the second fluid amplifier stage is then connected to a suitable pressure sensing means such as a manometer or the like.

Additional objects, features, and advantages of the present invention will become apparent to those skilled in the art, from the following detailed description and the attached drawings on which, by way of example, only the preferred embodiments of this invention are illustrated.

DETAILED DESCRIPTION

By the term fluid as used herein is meant any compressible fluid such as air, nitrogen or other gases or incompressible fluid such as water or the like, which fluids may contain solid particles. This invention is not limited to any particular fluid.

Figure 1:
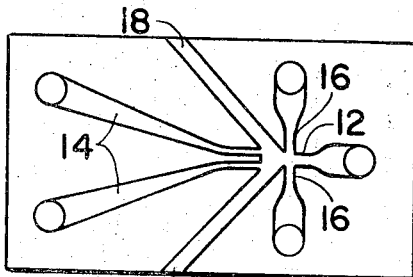
FIG. 1 is a plan view of vent-type proportional fluid amplifier.

FIG. 1 illustrates a vent-type proportional fluid amplifier 10. A proportional fluid amplifier is one wherein the power stream emitted from power nozzle 12 is directed to one or the other or both of the outlet passages 14 in proportion to the magnitude of the control signals applied to control nozzles 16. Entrainment fluid flow and venting of excess fluids is accomplished by means of vents 18.

Figure 2:
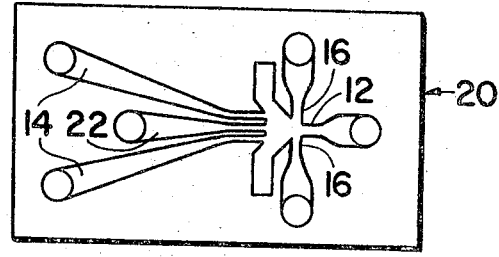
FIG. 2 is a plan view of a center dump type of proportional fluid amplifier.

Referring to FIG. 2, a center dump proportional fluid amplifier 20 is illustrated. In such an amplifier the power stream may be directed to either of outlet passages 14 or to center vent or dump passage 22. As is well known in the art, a center dump proportional fluid amplifier minimizes the secondary fluid flows within the device.

Figure 3:
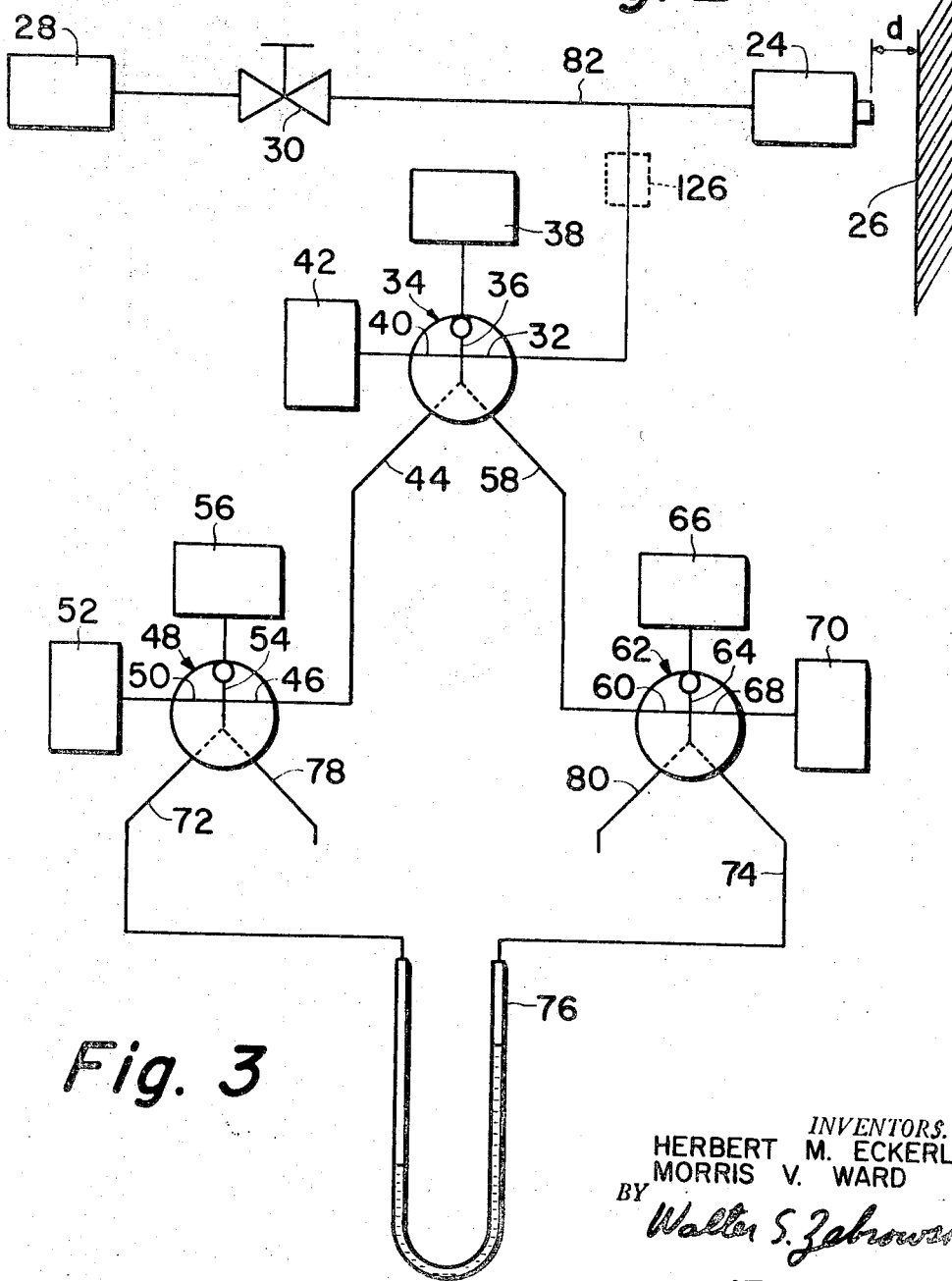
FIG. 3 is a schematic diagram illustrating one embodiment of the fluidic air gauge signal amplification and display circuit of the present invention.

Referring to FIG. 3, an air gauge nozzle 24 is shown disposed such that the stream emitted from the end thereof is directed against a surface of member 26. The air gauge nozzle is connected to a suitable source 28 of pressurized gas or air through a control valve 30. Although the circuit is shown with control valve 30, a fixed restrictor or orifice may be employed.

Control nozzle 32 of proportional fluid amplifier 34 is connected upstream of air gauge nozzle 24 to sense the back pressure thereof. Fluid amplifier 34 comprises the first fluid amplifier stage. Inlet nozzle 36 of fluid amplifier 34 is connected to a suitable source 38 of fluid. The other control nozzle 40 of fluid amplifier 34 is connected to a suitable source 42 of biasing fluid.

Outlet 44 of fluid amplifier 34 is connected to control nozzle 46 of proportional fluid amplifier 48. The other control nozzle 50 of fluid amplifier 48 is connected to a suitable source 52 of biasing fluid while the inlet nozzle 54 is connected to a suitable source 56 of fluid. Outlet passage 58 of fluid amplifier 34 is connected to control nozzle 60 of proportional fluid amplifier 62. The inlet nozzle 64 of this fluid amplifier is connected to a suitable source 66 of fluid, while control nozzle 68 thereof is connected to a suitable source 70 of biasing fluid. Fluid amplifiers 48 and 62 comprise the second fluid amplifier stage of this circuit. Outlet passage 72 of fluid amplifier 48 and outlet passage 74 of fluid amplifier 62, which outlet passages comprise the outlet passages of the second amplifier stage, are connected to manometer 76 while the remaining outlet passages 78 and 80 of fluid amplifiers 48 and 62 respectively are vented.

The operation of the circuit of FIG. 3 is as follows. Gas or air from supply 28 is emitted from air gauge nozzle 24 against the surface of member 26. The amount of flow of air or gas is controlled by valve 30 which in turn controls in part the back pressure which is developed in connecting line 82 between valve 30 and air gauge nozzle 24. After valve 30 is set, the back pressure in line 82 will be inversely proportional to distance $d$ between air gage nozzle 24 and member 26. The back pressure in line 82 increases with a decrease in $d$ within the operating range of the apparatus or system.

With a biasing fluid applied to control nozzle 40 of proportional fluid amplifier 34, changes in back pressure in line 82 will directly affect the amount of fluid, of the power stream from nozzle 36 thereof, that will flow through either outlet 44 or outlet 58 of the first amplifier stage. Proportional fluid amplifiers 48 and 62 operate in a similar manner. For example, as the amount of fluid flow through outlet passage 44 changes, the amount of fluid flowing through outlet passage 72 of amplifier 48 will proportionately change since a fixed flow of biasing fluid is provided through control nozzle 50 thereof. Similarly, the amount of fluid flow in outlet passage 74 of amplifier 62 will be directly proportional to the amount of fluid flowing in outlet passage 58 of fluid amplifier 34, since control nozzle 68 of fluid amplifier 62 is provided with a quantity of biasing fluid from source 70. Since both outlets 72 and 74 are connected to manometer 76, variations in back pressure within line 82 and in turn variations in distance $d$ will be directly reflected in a displacement reading on manometer 76.

Figure 4:
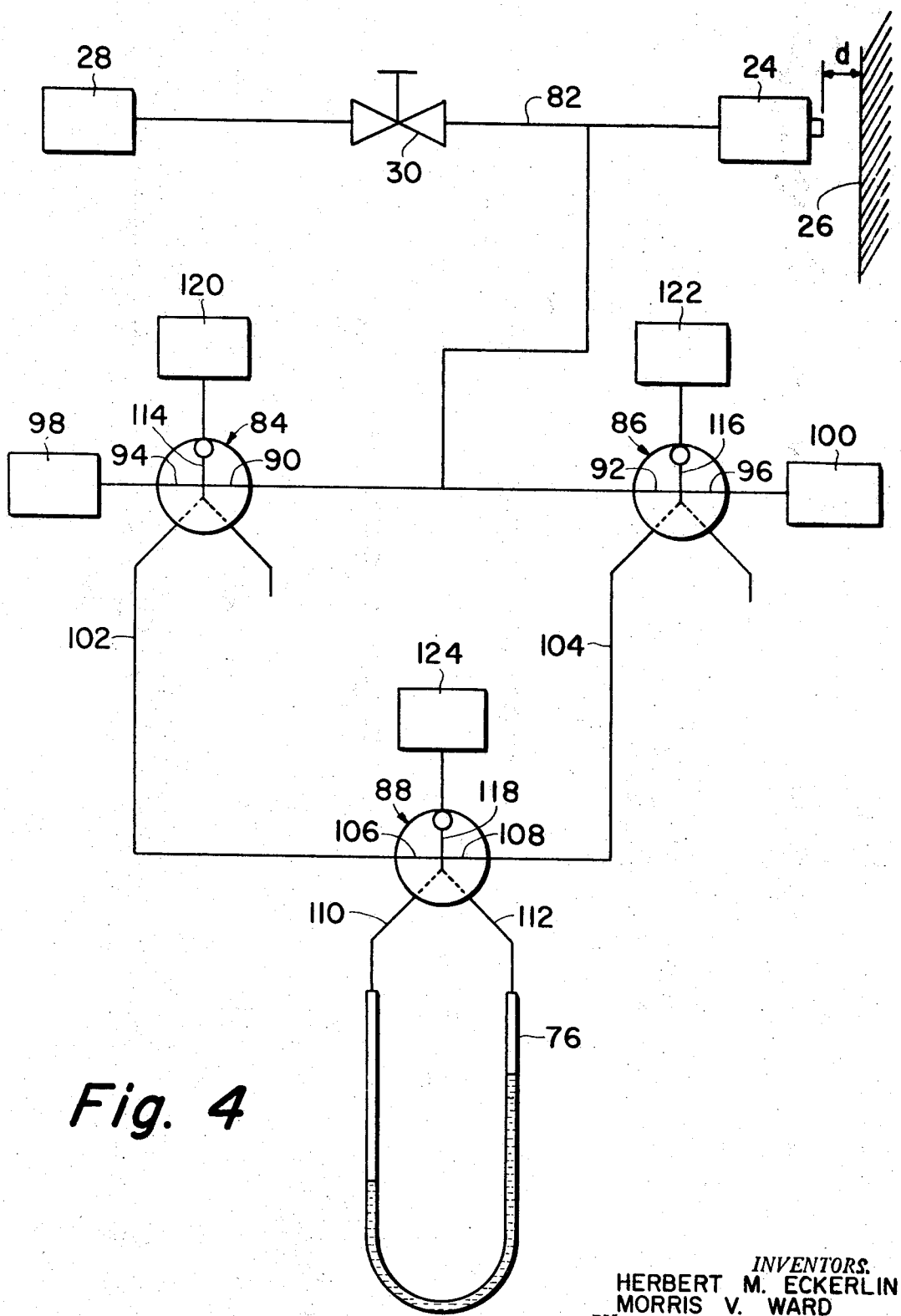
FIG. 4 is a schematic diagram illustrating another embodiment of the fluidic air gauge signal amplification and display circuit of the present invention.

Another embodiment of the present invention is illustrated in FIG. 4. In this embodiment the first fluid amplifier stage comprises proportional fluid amplifiers 84 and 86, while the second fluid amplifier stage comprises proportional fluid amplifier 88. Control nozzles 90 and 92 of amplifiers 84 and 86 respectively are connected together and also to line 82 to sense the back pressure of air gauge nozzle 24. The respective opposing control nozzles 94 and 96 are connected to suitable sources 98 and 100 of biasing fluid. Outlet 102 of amplifier 84 and outlet 104 of amplifier 86 comprise the first fluid amplifier stage outlets and are respectively connected to the opposing control nozzles 106 and 108 of the second fluid amplifier stage. Outlets 110 and 112 of amplifier 88 which comprise the outlets of the second fluid amplifier stage are connected to manometer 76. The inlet nozzles 114, 116, and 118 are connected to suitable sources 120, 122, and 124 of fluid.

The operation of this embodiment is the same as that of FIG. 3 except that fluid amplifier 88 does not have a separate biasing fluid source. The fluid flows through control nozzles 106 and 108 in effect are biasing fluids for each other.

As is readily understood in the art, a fluid amplifier in effect results in an amplification of the fluid signal as a result of a small control fluid flow which effects a substantially larger power stream flow. It has been found that in a circuit such as that illustrated in FIG. 3, with air provided from sources 28, 38, 56, and 66 at 15 p.s.i.g., air provided from biasing source 42 at 7 p.s.i.g., and air provided from biasing sources 52 and 70 at 1.5 p.s.i.g., a circuit sensitivity of 1.0 inch HG per 0.0001 inch change in $d$ was obtained. The linear range was 0.002 inch. As is readily seen, the air gauge pressure level operation was substantially lower than heretofore possible since a relatively low pressure and fluid flow is required to be applied to control nozzle 32 to operate amplifier 34.

It should be noted that any number of fluid amplifier stages may be incorporated into the circuit of the present invention depending on the degree of amplification required. Additional stages could be connected to the outlets of the last stage in the manner as heretofore described for the second stage.

As is readily understood, an electronic pressure sensor, recorder, or similar device may be substituted for manometer 76.

The embodiments of the present invention have been described wherein alternate fluid amplifier stages have two fluid amplifiers. It has been found that with presently commercially available fluid amplifiers, if each stage would only have one fluid amplifier where the outlets of the first are connected to the control nozzles of the succeeding amplifier, the circuit would be unstable in that feedback from the second stage would interfere with the operation of the first stage. Single fluid amplifier stages, however, are possible and are within the scope of this invention if closer tolerance proportional fluid amplifiers are employed.

It has been found that center dump proportional fluid amplifiers are particularly suitable for the present purposes although vent-type amplifiers are also suitable. However, center dump proportional amplifiers must be used for amplifiers 48 and 62 if outlet passages 78 and 80 thereof are deadened or closed off since vent-type proportional fluid amplifiers will tend to oscillate under such conditions.

Where, as in the heretofore described example, one fluid or gas is used throughout the circuit, a single fluid source may be used, and desired pressures and flows obtained by employing suitable valves or line restrictors.

To further decrease the fluid pressure applied to control nozzle 32 of amplifier 34, a valve or line restrictor may be connected intermediate air gauge nozzle 24 and control nozzle 32 as illustrated by dotted line 126 in FIG. 3. Such an arrangement also decreases fluid bleed from line 82.

We claim:
1. A fluidic air gauge signal amplification circuit comprising:
   an air gage;
   means for flowing a gas through said air gauge;
   a first fluid amplifier stage having at least one proportional fluid amplifier, each amplifier embodying a power stream nozzle, a pair of control nozzles, and a pair of outlets, said first fluid amplifier stage having a pair of outlets;
   means for connecting one of the control nozzles of each fluid amplifier of said first fluid amplifier stage to the upstream side of said air gage;
   means for providing a biasing fluid connected to the other control nozzle of each fluid amplifier of said first fluid amplifier stage;
   a second fluid amplifier stage having at least one proportional fluid amplifier, each amplifier embodying a power stream nozzle, and a pair of outlets, said second fluid amplifier stage embodying control nozzle means and having a pair of outlets;
   means connecting said first fluid amplifier stage outlets to said second fluid amplifier stage control nozzle means;
   means for sensing differential pressure connected to said second fluid amplifier stage outlets; and of the power stream nozzles of said fluid amplifiers.
   a source of fluid connected to each of the
2. The fluidic circuit of claim 1 wherein said means for sensing differential pressure is a manometer.
3. The fluidic amplification circuit of claim 1 wherein said means for sensing differential pressure is an electrical sensor.
4. The fluidic amplification circuit of claim 1 further comprising a means for regulating the flow of gas through said air gage.
5. The fluidic amplification circuit of claim 1 wherein said first fluid amplifier stage comprises one proportional fluid amplifier and said second fluid amplifier stage comprises two proportional fluid amplifiers with each of said second stage amplifiers embodying a pair of control nozzles.
6. The fluidic amplification circuit of claim 5 wherein one outlet of said first fluid amplifier stage is connected to one of the control nozzles of one of the amplifiers of said second stage while the other outlet of said first stage is connected to one of the control nozzles of the other amplifier of said second stage.
7. The fluidic amplification circuit of claim 6 further comprising a means for providing a biasing fluid connected to each of the remaining control nozzles of the amplifiers of said second stage.
8. The fluidic amplification circuit of claim 7 wherein said proportional fluid amplifiers are of the center dump type.
9. The fluidic amplification circuit of claim 7 further comprising a means for restricting fluid flow connected intermediate the upstream side of said air gauge and said one of said control nozzles of the first stage fluid amplifier.
10. The fluidic amplification circuit of claim 1 wherein said first fluid amplifier stage comprises two proportional fluid amplifiers and said second fluid amplifier stage comprises one proportional fluid amplifier.
11. The fluidic amplification circuit of claim 10 wherein the outlets of said first fluid amplifier stage are connected to the opposing control nozzles of the fluid amplifier of the second stage.
12. The fluidic amplification circuit of claim 11 wherein said proportional fluid amplifiers are of the center dump type.
13. The fluidic amplification circuit of claim 12 further comprising means for restricting fluid flow connected intermediate the upstream side of side air gauge and said one control nozzle of each of said fluid amplifiers.
14. A fluidic amplification circuit comprising:
   source of fluid signals;
   a first fluid amplifier stage having at least one proportional fluid amplifier, each amplifier embodying a power stream nozzle, a pair of control nozzles, and a pair of outlets, said first stage having a pair of outlets;
   means for connecting said source of fluid signals to one of the control nozzles of each fluid amplifier of said first stage;
   means for providing a biasing fluid connected to the other control nozzle of each fluid amplifier of said first stage;

a second fluid amplifier stage having at least one proportional fluid amplifier, each amplifier embodying a power stream nozzle, and a pair of outlets, said second stage embodying control nozzle means and having a pair of outlets;

one of said first and second fluid amplifier stages having at least two proportional fluid amplifiers;

means connecting said second stage control nozzle means only to said pair of first stage outlets; and a source of fluid connected to each of the power stream nozzles of said fluid amplifiers.

15. The fluidic amplification circuit of claim 14 further comprising means for sensing differential pressure connected to said second stage outlets.

UNITED STATES PATENT OFFICE
CERTIFICATE OF CORRECTION

Patent No. 3,543,779            Dated December 1, 1970

Inventor(s) Herbert M. Eckerlin and Morris V. Ward

It is certified that error appears in the above-identified patent and that said Letters Patent are hereby corrected as shown below:

Claim 1, column 4, lines 19 and 20 delete "of the power stream nozzles of said fluid amplifiers."

Claim 1, column 4, to the end of line 21 add --power stream nozzles of said fluid amplifiers.--

Claim 13, line 3, "side" second occurrence should be --said--.

SIGNED AND
SEALED
MAR 16 1971

(SEAL)
Attest:

Edward M. Fletcher, Jr.
Attesting Officer

WILLIAM E. SCHUYLER, JR.
Commissioner of Patents